US009440404B2

(12) United States Patent
Martin

(10) Patent No.: US 9,440,404 B2
(45) Date of Patent: Sep. 13, 2016

(54) NON-PNEUMATIC TIRE AND SYSTEM FOR MOLDING NON-PNEUMATIC TIRE

(71) Applicant: CATERPILLAR INC., Peoria, IL (US)

(72) Inventor: Kevin L. Martin, Washburn, IL (US)

(73) Assignee: Caterpillar Inc., Peoria, IL (US)

( * ) Notice: Subject to any disclaimer, the term of this patent is extended or adjusted under 35 U.S.C. 154(b) by 423 days.

(21) Appl. No.: 13/952,095

(22) Filed: Jul. 26, 2013

(65) Prior Publication Data

US 2015/0027606 A1 Jan. 29, 2015

(51) Int. Cl.
*B29D 30/02* (2006.01)
*B60C 7/10* (2006.01)
*B29K 75/00* (2006.01)

(52) U.S. Cl.
CPC .............. *B29D 30/02* (2013.01); *B60C 7/10* (2013.01); *B29K 2075/00* (2013.01); *B29K 2875/00* (2013.01); *B60C 2007/005* (2013.04); *B60C 2007/107* (2013.04)

(58) Field of Classification Search
CPC ............ B29D 30/02; B60C 2007/005; B60C 2007/107; B60C 7/10; B29K 2075/00; B29K 2875/00
USPC ............................. 152/17, 40, 248; 156/113
See application file for complete search history.

(56) References Cited

U.S. PATENT DOCUMENTS

| | | | | |
|---|---|---|---|---|
| 4,514,243 A * | 4/1985 | Moore, III | .......... | B29C 66/1122 152/311 |
| 5,265,659 A * | 11/1993 | Pajtas | ..................... | B29C 33/76 152/323 |
| 5,343,916 A * | 9/1994 | Duddey | .................... | B60C 7/12 152/326 |
| 6,085,815 A | 7/2000 | Piper et al. | | |
| 7,329,325 B2 * | 2/2008 | Prost | .................. | B29D 30/0662 152/152.1 |
| 8,555,941 B2 * | 10/2013 | Perron | ...................... | B60C 7/18 152/246 |
| 2011/0180194 A1 * | 7/2011 | Anderson | ............... | B60C 17/06 152/520 |
| 2012/0038206 A1 | 2/2012 | Chadwick et al. | | |
| 2014/0083581 A1 * | 3/2014 | Schaedler | ................. | B60B 9/26 152/5 |

FOREIGN PATENT DOCUMENTS

WO 2008053450 5/2008

\* cited by examiner

*Primary Examiner* — John Walters
*Assistant Examiner* — Brian Swenson
(74) *Attorney, Agent, or Firm* — Finnegan, Henderson, Farabow, Garrett & Dunner, LLP

(57) ABSTRACT

A system for molding a non-pneumatic tire may include a lower mold portion including a lower face plate configured to provide a lower relief corresponding to a first side of the tire. The system may further include an upper mold portion configured to be coupled to the lower mold portion. The upper mold portion may include an upper face plate configured to provide an upper relief corresponding to a second side of the tire. The system may also include a plurality of mold inserts configured to be positioned between the lower and upper face plates. The mold inserts may include a shell portion at least partially enclosing a void configured to provide a cavity in the tire, and the shell portion of the mold inserts is configured to remain embedded in the tire upon removal of the tire from the lower and upper mold portions.

7 Claims, 3 Drawing Sheets

NON-PNEUMATIC TIRE AND SYSTEM FOR MOLDING NON-PNEUMATIC TIRE

TECHNICAL FIELD

The present disclosure relates to tires and systems for molding tires, and more particularly, to non-pneumatic tires and systems for molding non-pneumatic tires.

BACKGROUND

Tires may be formed by introducing a moldable material into a mold and removing the molded tire from the mold following curing of the moldable material. In order to remove the molded tire from the mold, however, the mold must be designed according to certain limitations, and the design features of the tire must take into consideration such limitations. It may be desirable for the molded tire to have recesses. However, the shape of the recesses is limited to shapes that permit separation of the molded tire from the mold. As a result, it is generally necessary for the portions of the mold that form the recesses to be configured in such a manner that the molding material does not serve to lock the molded tire in the mold. Thus, such recess-forming mold portions must generally be at least slightly tapered to have a smaller cross-section in the direction of the interior of the tire (i.e., they have a "draft"), so that the molding portions may slide out of the recesses formed by the recess-forming mold portions. In addition, the recess-forming mold portions must generally be formed parallel to the direction in which the recess-forming mold portions separate from the recesses. As a result, the configuration of the recesses may be undesirably limited to, for example, recesses that extend generally parallel to a single direction. As a result, it may be desirable to provide systems and methods for molding tires that provide greater design options for structures such as recesses.

An example of a mold and method for forming a non-pneumatic tire is disclosed in U.S. Patent Application Publication No. US 2012/0038206 A1 to Chadwick et al. ("the '206 publication"). In particular, the '206 publication discloses fabricating a non-pneumatic tire and wheel assembly by casting with a pour molding process. An outer mold element is received within a preformed tread. The outer mold element extends from a flat plate and incorporates struts corresponding to spoke locations in the tire body element and includes apertures to receive rubber mold blocks. An inner mold element is concentrically received over the tread and incorporates struts and apertures symmetrical with the outer mold element. Rubber casting blocks are inserted through the apertures in the inner mold element and received in corresponding apertures in the outer mold element to complete the casting mold. Sizing of the struts and apertures in the outer and inner mold elements and the rubber casting blocks provides corresponding sizing of the spokes in the cast tire body element. Elastomeric material is introduced through fill tubes to completely fill the interstitial spaces between the rubber mold blocks, is allowed to cure, and the rubber mold blocks and inner and outer mold elements are removed.

Although the mold and method disclosed in the '206 publication permit spokes to be molded into a molded tire, the mold and method may suffer from a number of possible drawbacks. For example, the method may be undesirably complex. In addition, the design of the tire is limited by the need to remove the mold blocks from the tire following molding, thereby limiting the ability to mold certain desired features into the molded tire.

The tire, systems, and methods disclosed herein may be directed to mitigating or overcoming one or more of the possible drawbacks set forth above.

SUMMARY

According to one aspect, the present disclosure is directed to a system for molding a non-pneumatic tire. The system may include a lower mold portion including a lower face plate configured to provide a lower relief corresponding to a first side of the tire. The system may further include an upper mold portion configured to be coupled to the lower mold portion. The upper mold portion may include an upper face plate configured to provide an upper relief corresponding to a second side of the tire. The system may also include a plurality of mold inserts configured to be positioned between the lower face plate and the upper face plate when the upper mold portion is coupled to the lower mold portion. The mold inserts may include a shell portion at least partially enclosing a void configured to provide a cavity in the tire, and the shell portion of the mold inserts is configured to remain embedded in the tire upon removal of the tire from the lower mold portion and the upper mold portion.

According to a further aspect, a molded non-pneumatic tire may include an inner circumferential barrier configured to be coupled to a hub, and an outer circumferential barrier radially spaced from the inner circumferential barrier. The tire may further include a support structure having two opposing sides extending between the inner circumferential barrier and the outer circumferential barrier, and coupling the inner circumferential barrier to the outer circumferential barrier. The support structure may include a plurality of mold inserts at least partially embedded in the support structure, wherein the mold inserts include a shell portion at least partially enclosing a void providing a cavity in the support structure.

According to another aspect, a method of forming a molded non-pneumatic tire may include providing a lower mold portion including a lower face plate configured to provide a lower relief corresponding to a first side of the tire. The method may further include positioning a plurality of mold inserts in the lower mold portion, wherein the mold inserts include a shell portion at least partially enclosing a void configured to provide a cavity in the tire. The method may also include placing an upper mold portion onto the lower mold portion to create a mold assembly having an interior. The upper mold portion may include an upper face plate configured to provide an upper relief corresponding to a second side of the tire. The method may further include heating a molding material and transferring the heated molding material into the interior of the mold assembly, such that the interior except for the voids is substantially filled. The method may also include curing the heated molding material, and separating the upper mold portion from the lower mold portion. The method may further include separating the tire from the lower mold portion, such that the mold inserts remain in the tire following separation of the tire from the lower mold portion to create cavities in the tire corresponding to the voids.

DETAILED DESCRIPTION

Figure 1:
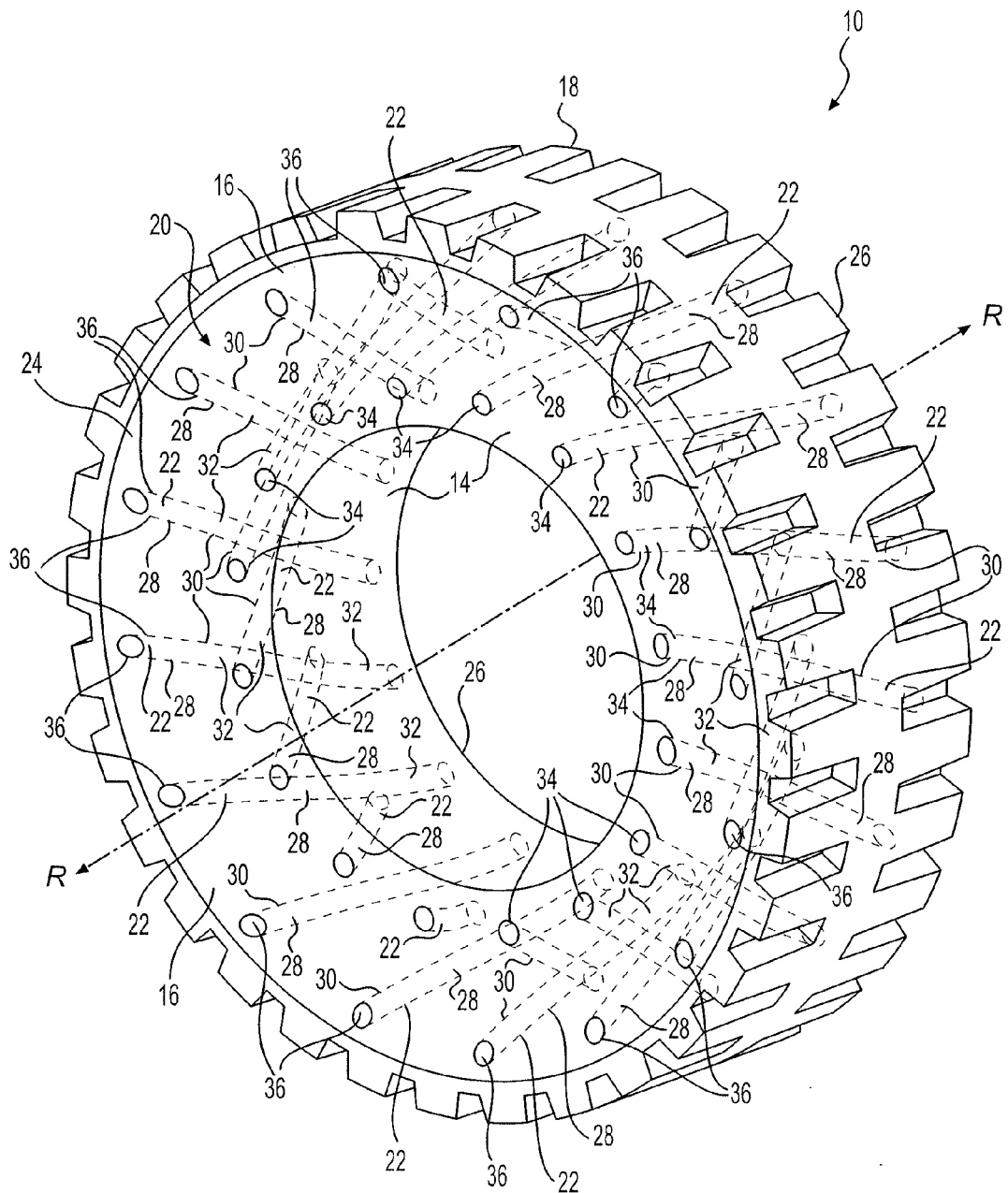
FIG. 1 is a semi-transparent perspective view of an exemplary embodiment of a molded tire.
Figure 3:
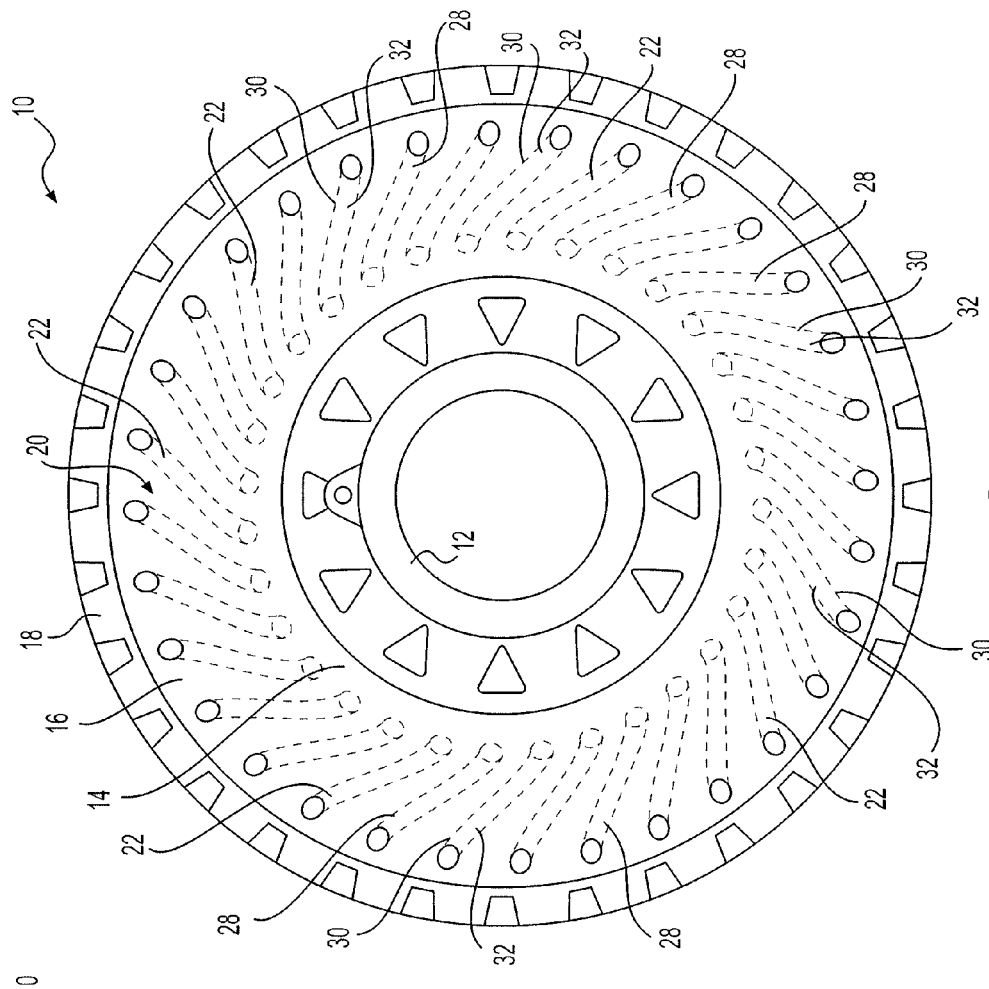
FIG. 3 is a semi-transparent side view of the exemplary embodiment of the molded tire shown in FIG. 1.
Figure 2:
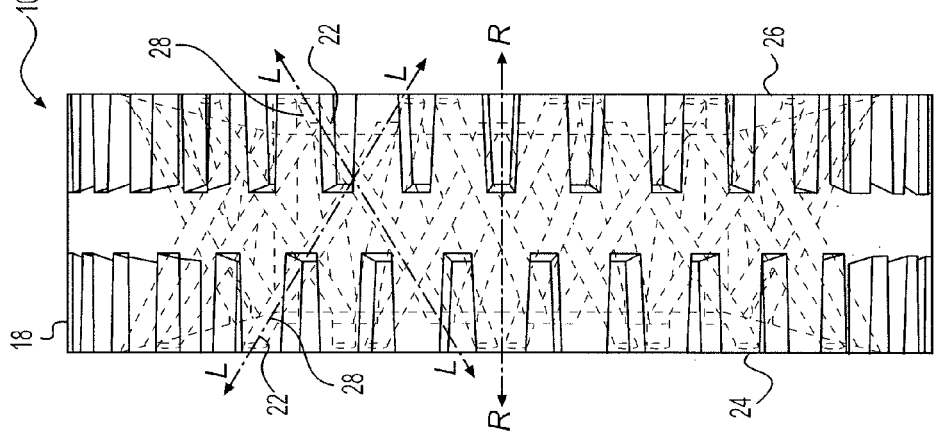
FIG. 2 is a semi-transparent front view of the exemplary embodiment of the molded tire shown in FIG. 1.

FIGS. 1-3 show an exemplary embodiment of a tire 10. Exemplary tire 10 is a molded, non-pneumatic tire. Tire 10 may be installed on a machine configured to travel across terrain. For example, such machines may include any type of ground-borne vehicle, such as, for example, an automobile, a truck, an agricultural vehicle, and/or a construction vehicle, such as, for example, a wheel loader, a dozer, a skid-steer loader, an excavator, a grader, an on-highway truck, an off-highway truck, and/or any other vehicle type known to a person skilled in the art. In addition to self-propelled machines, the machine may be any device configured to travel across terrain via assistance or propulsion from another machine.

According to some embodiments, tire 10 may include a hub 12 (see FIG. 3) configured to couple tire 10 to a machine. Exemplary tire 10 includes an inner circumferential barrier 14 configured to be coupled to hub 12, and an outer circumferential barrier 16 configured to be coupled to, or provided with, a tread portion 18 configured to improve traction of tire 10 at the interface between tire 10 and the terrain across which tire 10 rolls. Extending between inner circumferential barrier 14 and outer circumferential barrier 16 is a support structure 20. Exemplary support structure 20 serves to couple inner circumferential barrier 14 and outer circumferential barrier 16 to one another. Hub 12 and/or inner circumferential barrier 14 may be configured to facilitate coupling of hub 12 to inner circumferential barrier 14.

According to some embodiments, support structure 20, inner circumferential barrier 14, and/or outer circumferential barrier 16 are integrally formed as a single, monolithic piece, for example, via molding. However, it is also contemplated that support structure 20, inner circumferential barrier 14, and/or outer circumferential barrier 16 may be formed separately and thereafter coupled to one another via adhesives and/or mechanical methods (e.g., via fasteners and/or complementary portions on adjacent parts.)

Tire 10, including inner circumferential barrier 14, outer circumferential barrier 16, tread portion 18, and support structure 20, may be configured to provide a desired amount of traction and cushioning between a machine and the terrain. For example, support structure 20 may be configured to support the machine in a loaded, partially loaded, and empty condition, such that a desired amount of traction and/or cushioning is provided, regardless of the load.

For example, for some machines such as a wheel loader, when its bucket is empty, the load on one or more of its tires may range from about 60,000 lbs. to about 160,000 lbs. (e.g., 120,000 lbs.). In contrast, with its bucket loaded with material, the load on one or more of its tires may range from about 200,000 lbs. to about 400,000 lbs. (e.g., 350,000 lbs.). Thus, tire 10 may be configured to provide a desired level of traction and cushioning, regardless of whether the machine on which it's installed is loaded, partially loaded, or empty. For smaller machines, correspondingly lower loads are contemplated. For example, for a skid-steer loader, the load on one or more of its tires may range from about 1,000 lbs. empty to about 3,000 lbs. (e.g., 2,400 lbs.) loaded.

In order to provide the desired amount of cushioning and support, tire 10 may include a number of cavities 22 configured to increase the level of cushioning of tire 10 while still maintaining a desired level of support for the machine on which tire 10 is installed. For example, the exemplary embodiment of tire 10 shown FIGS. 1-3 includes a plurality of cavities 22 that extend at least partially between a first side 24 of tire 10 and a second side 26 of tire 10, which oppose one another. According to the exemplary embodiment shown in FIGS. 1-3, the plurality of cavities 22 extend between first side 24 and second side 26 such that the cavities 22 open to first side 24 and second side 26. It is contemplated that for some embodiments of tire 10, cavities 22 may open to only one of the opposing sides 24 and 26 of tire 10.

According to some embodiments, at least some of cavities 22 define a longitudinal axis L, for example, as shown in FIGS. 1-3. In the exemplary embodiment shown, the longitudinal axes L of cavities 22 are oblique with respect to the rotational axis R about which tire 10 rolls. Thus, as cavities 22 extend between opposing sides 24 and 26 of tire 10, cavities 22 extend in a radial direction (i.e., toward or away from the center of tire 10) as well as in an axial direction (i.e., in a direction parallel to rotational axis R).

Figure 4:
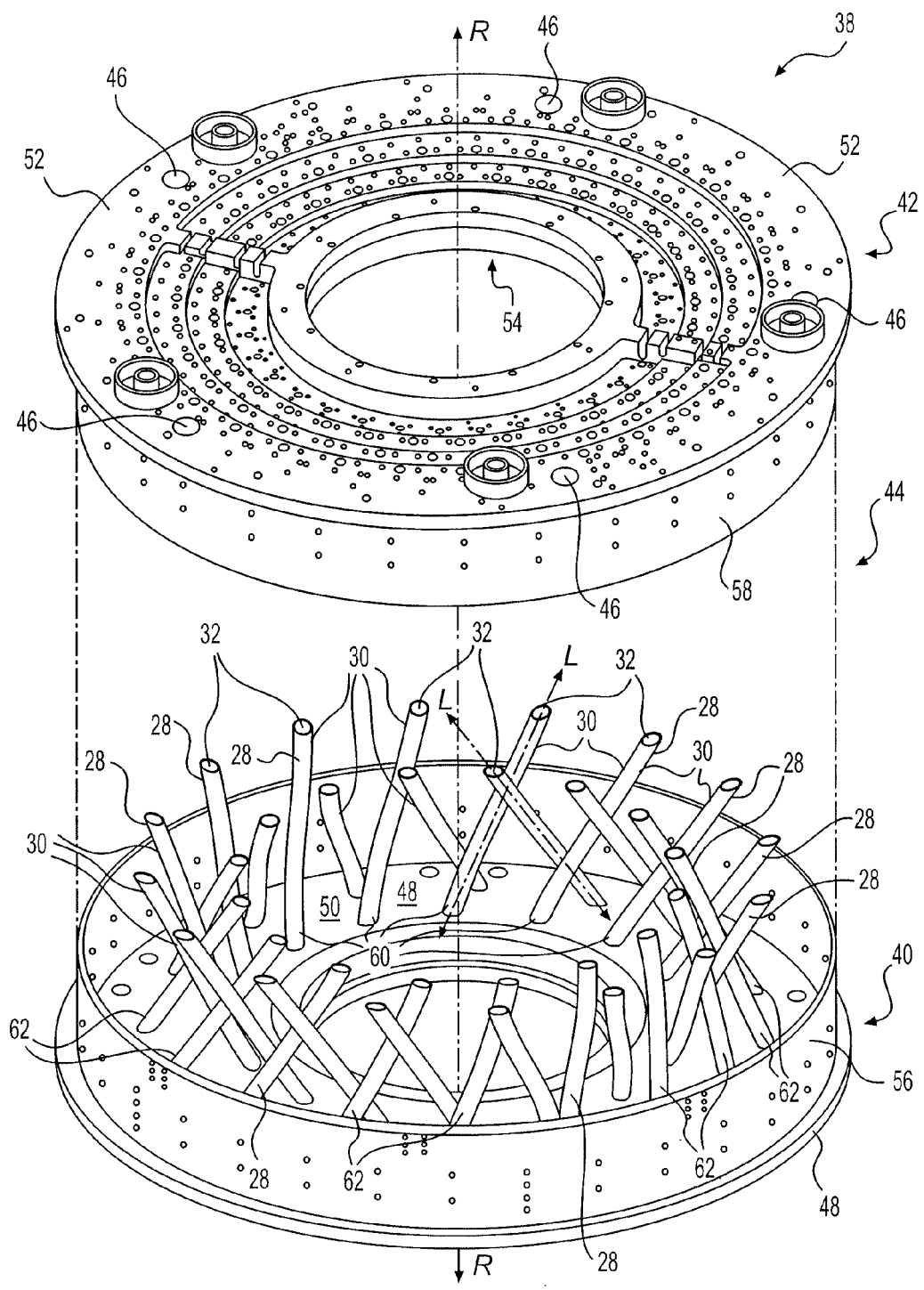
FIG. 4 is a schematic exploded view of an exemplary embodiment of a system for molding a tire.

According to some embodiments, cavities 22 are formed by mold inserts 28 (see also FIG. 4). Exemplary mold inserts 28 shown in FIGS. 1-4 include a shell portion 30 at least partially enclosing a void 32, which, in turn, forms a cavity 22. According to some embodiments, mold inserts 28 are molded into tire 10, and thus, they are integrated into tire 10.

According to some embodiments, cavities 22 have a cross-sectional shape that varies and/or a cross-sectional area that varies. According to some embodiments, cavities 22 have a cross-sectional shape and/or a cross-sectional area that is substantially constant. For example, as shown in FIGS. 1-3, cavities 22 have a cross-sectional shape and cross-sectional area that remains substantially constant along the length of the cavities 22.

The exemplary cavities 22 shown in FIGS. 1-3 are tubular and slightly curved. In the exemplary embodiment shown, a first plurality 34 of cavities 22 forms an inner circular pattern with respect to first side 24 of support structure 20, and a second plurality 36 of cavities 22 forms an outer circular pattern with respect to first side 24 of support structure 20. First plurality 34 of cavities 22 extend radially outward as they extend from first side 24 of support structure 20 to second side 26 of support structure 20. Second plurality 36 of cavities 22 extend radially inward as they extend from first side 24 of support structure 20 to second side 26 of support structure 20. Other arrangements are contemplated.

According to some embodiments, tread portion 18 and/or support structure 20 is formed from polyurethane. According to some embodiments, tread portion 18 is chemically bonded to support structure 20. For example, at least some of the polyurethane of tread portion 18 is covalently bonded to at least some of the polyurethane of support structure 20. This may result in a superior bond as compared with bonds formed via adhesives, mechanisms, or fasteners. According to some embodiments, tread portion 18 and support structure 20 may be formed as a single, monolithic structure molded together in a common mold.

According to some embodiments, the polyurethane of tread portion 18 may have a content different than the polyurethane of support structure 20, such that tread portion 18 and support structure 20 have different material characteristics. As a result, it may be possible to tailor the characteristics of tread portion 18 and support structure 20 to characteristics desired for those respective portions of tire 10. For example, the polyurethane of support structure 20 may be selected to be relatively stiffer and/or stronger than the polyurethane of tread portion 18, so that support structure 20 may have sufficient stiffness and strength to support the anticipated load on tires 10. According to some embodiments, the polyurethane of tread portion 18 may be selected to be relatively more cut-resistant and wear-resistant and/or have a higher coefficient of friction than the polyurethane of support structure 20, so that regardless of the polyurethane selected for support structure 20, tread portion 18 may provide the desired wear and/or traction characteristics for tire 10.

According to some embodiments, the polyurethane of tread portion 18 and/or support structure 20 may include polyurethane urea materials based on one or more of polyether, polycaprolactone, and polycarbonate polyols that may provide relatively enhanced fatigue strength and/or a relatively low heat build-up (e.g., a low tan δ). For example, for high humidity environments it may be beneficial for the polyurethane to provide a low tan δ for desired functioning of the tire after moisture absorption. Such polyurethane urea materials may include polyurethane prepolymer capped with methylene diisocyanate (MDI) that may strongly phase segregate and form materials having relatively enhanced crack propagation resistance, which may improve fatigue strength. Alternative polyurethanes capped with toluene diisocyanate (TDI), napthalene diisocyanate (NDI), or paraphenylene diisocyanate (PPDI) may also be used. Such polyurethane prepolymer materials may be cured with aromatic diamines that may also encourage strong phase segregation. Exemplary aromatic diamines include methylene diphenyl diamine (MDA) that may be bound in a salt complex such as tris(4,4'-diamino-diphenyl methane) sodium chloride (TDDM). Chemical crosslinking in the polyurethane urea may provide improved resilience to support structure 20. Such chemical crosslinking may be achieved by any means known in the art, including but not limited to: the use of tri-functional or higher functionality prepolymers, chain extenders, or curatives; mixing with low curative stoichiometry to encourage biuret, allophanate, or isocyanate formation; including prepolymer with secondary functionality that may be cross-linked by other chemistries (e.g., by incorporating polybutadiene diol in the prepolymer and subsequently curing such with sulfur or peroxide cross-linking).

According to some embodiments, mold inserts 28 may be formed of polyurethane. For example, mold inserts 28 may be formed of a polyurethane similar to or the same as the polyurethane forming support structure 20. According to some embodiments, the polyurethane forming mold inserts 28 may have a content different from the content of the polyurethane forming support structure 20. According to some embodiments, mold inserts 28 may be formed of polyurethane that is partially cured prior to being molded into support structure 20. For example, partially-cured mold inserts 28 may be placed in a mold for forming tire 20. Polyurethane for forming support structure 20 may then be supplied to the mold, such that mold inserts 28 are at least partially embedded in support structure 20, after which the polyurethane of tire 10, including support structure 20 and mold inserts 28, is cured. According to some embodiments, this results in support structure 20 and mold inserts 28 being chemically bonded to one another (e.g., covalently bonded to one another).

Some embodiments of the polyurethane forming mold inserts 28 may be mixed with a stoichiometry that is prepolymer rich (e.g., isocyanate rich). That is, in a polyurethane urea system there is a theoretical point where each isocyanate group will react with each curative (amine) functional group. Such a point would be considered to correspond to a stoichiometry of 100%. In a case where excess curative (diamine) is added, the stoichiometry would be considered to be greater than 100%. In a case where less curative (diamine) is added, the stoichiometry would be considered to be less than 100%. For example, if a part is formed with a stoichiometry less than 100%, there will be excess isocyanate functionality remaining in the part. Upon high temperature postcuring of such a part (e.g., subjecting the part to a second heating cycle following an initial, incomplete curing), the excess isocyanate groups will react to form urea linkages, biuret linkages, and isocyanurates through cyclo-trimerization, or crosslinks through allophanate formation. According to some embodiments, the polyurethane of mold inserts 28 may be chemically similar to the polyurethane of support structure 20, but formulated to range from about 50% to about 90% of theoretical stoichiometry (i.e., from about 50% to about 90% "stoichiometric") (e.g., from about 60% to about 80% stoichiometric (e.g., about 75% stoichiometric)). Such polyurethane urea, even after forming an initial structure following so-called "green curing," is still chemically active through the excess isocyanate functional groups.

In such embodiments, the polyurethane of mold inserts 28 may be molded into a self-supporting shape and thereafter continue to maintain its ability to chemically react or bond with the polyurethane of support structure 20, even if the polyurethane of support structure 20 is substantially stoichiometric, by post-curing the polyurethanes together, for example, at a temperature of greater than at least about 150° C. (e.g., greater than at least about 160° C.) for a duration ranging from about 6 hours to about 18 hours (e.g., from 8 hours to 16 hours). As explained in more detail herein, self-supporting mold inserts 28 may be inserted into a mold for forming tire 10, and the polyurethane of support structure 20 may be supplied to the mold such that mold inserts 28 are at least partially embedded therein. According to some embodiments, the polyurethane of support structure 20 is substantially stoichiometric prior to curing (e.g., from about 95% to about 98% stoichiometric). In this exemplary manner, support structure 20 and mold inserts 28 may be chemically bonded to one another (e.g., covalently bonded to one another).

FIG. 4 schematically depicts an exemplary embodiment of a system 38 for molding a non-pneumatic tire, such as, for example, exemplary tire 10 shown in FIGS. 1-3. Exemplary system 38 includes a lower mold portion 40 and an upper mold portion 42 configured to be mounted on lower mold portion 40 to form a mold assembly 44 defining a sealed interior configured to receive a molding material. According to some embodiments, upper mold portion 42 may be mounted on lower mold portion 40 such that a hub 12 (see FIG. 3) associated with the molded tire is received between lower mold portion 40 and upper mold portion 42. In such embodiments, the combination of lower mold portion 40, upper mold portion 42, and hub 12 form mold assembly 44 defining a sealed interior configured to receive a molding material. According to some embodiments, upon receipt of the molding material, hub 12 is molded into the molded tire.

According to some embodiments, mold assembly 44 may include a plurality of circumferentially spaced guide assemblies configured to facilitate alignment of lower mold portion 40 and upper mold portion 42. Exemplary mold assembly 44 also includes a plurality of circumferentially spaced apertures 46 configured to provide a flow path for molding material to be supplied or transferred to the interior of mold assembly 44. As a result of having a number of apertures 46 for facilitating filling of mold assembly 44, molding material can be simultaneously supplied to the interior of mold assembly 44 via apertures 46, thereby increasing the rate at which the molding material may be supplied. This may be particularly desirable if, for example, the size of the tire being molded is particularly large and requires a large volume of molding material. Increasing the rate at which the molding material is added to mold assembly 44 may result in maintaining a relatively uniform temperature of the molding material at various locations in the interior of mold assembly 44 as the molding material is supplied to molding assembly 44.

As shown in FIG. 4, exemplary lower mold portion 40 includes a lower face plate 48. According to some embodiments, lower face plate 48 may be formed from two semicircular sections coupled to one another. Lower face plate 48 may be configured to provide a lower relief 50 corresponding to a side of the tire being molded (e.g., first side 24). Similarly, exemplary upper mold portion 42 includes an upper face plate 52. According to some embodiments, upper face plate 52 may include two semi-circular sections coupled to one another. Upper face plate 52 may be configured to provide an upper relief 54 corresponding to a side (e.g., second side 26) of the tire being molded opposite from the side formed by lower relief 50 of lower face plate 48. Lower face plate 48 and/or upper face plate 52 may be formed from a material having a high thermal conductivity, such as, for example, aluminum, which will facilitate heating and cooling of the molding material in the interior of mold assembly 44.

According to some embodiments, lower relief 50 and upper relief 54 may be configured such that the cross-section of the tire molded in mold assembly 44 increases with the radius of the tire. For example, the cross-section of the tire may be wider adjacent tread portion 18 than adjacent hub 12. For example, the cross-section may have a substantially trapezoidal shape.

As shown in FIG. 4, exemplary lower mold portion 40 includes a lower circular barrier 56 coupled to lower face plate 48. Exemplary lower circular barrier 56 is substantially perpendicular to lower face plate 48 and corresponds to a portion of an outer circumferential surface of the tire being molded (e.g., tread portion 18). Exemplary upper mold portion 42 includes an upper circular barrier 58 coupled to upper face plate 52. Exemplary upper circular barrier 58 is substantially perpendicular to upper face plate 52 and corresponds to a portion of an outer circumferential surface of the tire being molded (e.g., tread portion 18).

As shown in FIG. 4, exemplary system 38 includes a plurality of exemplary mold inserts 28 configured to be positioned between lower face plate 48 and the upper face plate 52 when upper mold portion 42 is coupled to lower mold portion 40. According to some embodiments, mold inserts 28 include a shell portion 30 at least partially enclosing a void 32, which is configured to provide a cavity 22 in tire 10. According to some embodiments, shell portion 30 of the mold inserts 28 is configured to remain embedded in the tire upon removal of the tire from lower mold portion 40 and upper mold portion 42 of mold assembly 44.

According to some embodiments, mold inserts 28 may be configured to be removed following demolding of the tire. For example, mold inserts 28 may remain in the tire during molding and although they could continue to remain in the tire during use, such embodiments of mold inserts 28 may be removed from the tire following demolding and before use of the tire. For example, mold inserts 28 may be tubular and may be configured to be removed (e.g., via pulling) from cavities 22 prior to use of the tire. Such embodiments of mold inserts 28 may be reused to form another tire. According to some embodiments, removable mold inserts 28 may be formed from tubing (e.g., tubing of silicone or other similar material).

In the exemplary embodiment shown in FIG. 4, mold inserts 28 define a longitudinal axis L and are configured to be positioned between lower face plate 48 and upper face plate 52 such that longitudinal axis L is oblique with respect to rotational axis R of the tire. According to some embodiments, mold inserts 28 may be intertwined and/or bound together with bands (e.g., bands of polyurethane or similar material). This may serve to hold mold inserts 28 in place when the molding material is added to mold assembly 44. According to some embodiments, voids 32 of mold inserts 28 have a cross-sectional shape and/or cross-sectional area that varies. According to some embodiments, voids 32 of mold inserts 28 have a cross-sectional shape and/or cross-sectional area that is substantially constant. For example, in the exemplary embodiment shown in FIG. 4, mold inserts 28 are tubular and configured to extend between lower face plate 48 and the upper face plate 52 when positioned between lower face plate 48 and upper face plate 52. According to some embodiments, mold inserts 28 may be configured such that shell portion 30 substantially or completely encloses void 32, for example, such as a hollow ball.

In the exemplary embodiment shown in FIG. 4, a first plurality 60 of mold inserts 28 is arranged to form an inner circular pattern with respect to lower mold portion 40, and a second plurality 62 of mold inserts 28 is arranged to form an outer circular pattern with respect to lower mold portion 40. First plurality 60 of mold inserts 28 extend radially outward as they extend from lower mold portion 40 (e.g., from lower face plate 48) to the upper mold portion 42 (e.g., upper face plate 52). Second plurality 62 of mold inserts 28 extend radially inward as they extend from lower mold portion 40 (e.g., from lower face plate 48) to the upper mold portion 42 (e.g., upper face plate 52). According to some embodiments, pairs of first plurality 60 of mold inserts 28 and second plurality 62 of mold inserts 28 are coupled together, for example, via bands (e.g., bands of polyurethane or similar material). Other arrangements of mold inserts 28 are contemplated.

According to some embodiments, mold inserts 28 may extend either partially or completely from lower face plate 48 to upper face plate 52, or from upper face plate 52 to lower face plate 48. According to some embodiments, mold inserts 28 may not extend to either lower face plate 48 or upper face plate 52, for example, such that voids 32 become enclosed when the molding material of the tire is supplied to the interior of mold assembly 44. According to some embodiments, mold inserts 28 may be configured such that voids 32 defined by shell portions 30 of respective mold inserts 28 intersect, thereby creating relatively more complex cavities 22 in the resulting tire 10. According to some embodiments, mold inserts 28 may be configured and arranged in mold assembly such that cavities 22 extend generally circumferentially about the tire.

According to an exemplary method a molded, non-pneumatic tire (e.g., exemplary tire 10) may be formed by providing lower mold portion 40, including lower face plate 48 and lower circular barrier 56. A plurality of mold inserts 28 may be positioned in lower mold portion 40. According to some embodiments, mold inserts 28 are arranged and/or configured such that longitudinal axes L of at least some mold inserts 28 extend obliquely with respect to rotational axis R of the tire. According to some embodiments, first plurality 60 of mold inserts 28 may be arranged in lower mold portion 40 to form an inner circular pattern with respect to lower mold portion 40, and a second plurality 62 of mold inserts 28 may be arranged in lower mold portion 40 to form an outer circular pattern with respect to lower mold portion 40. According to some embodiments, first plurality 60 of mold inserts 28 may be arranged such that they extend radially outward as they extend from lower mold portion 40 to upper mold portion 42. Second plurality 62 of mold inserts 28 may be arranged such that they extend radially inward as they extend from lower mold portion 40 to upper mold portion 42. According to some embodiments, pairs first plurality 60 of mold inserts 28 and second plurality 62 of mold inserts 28 may be coupled to one another, for example, via bands (e.g., bands of polyurethane or similar material). According to some embodiments, mold inserts 28 may be partially cured prior to being placed in lower mold portion 40.

Thereafter, upper mold portion 42, including upper face plate 52 and upper circular barrier 58, may be coupled to lower mold portion 40 to create mold assembly 44. Thereafter, the molding material (e.g., polyurethane or similar material) may be heated, and the heated molding material may be transferred into the interior of mold assembly 44 via apertures 46, such that the interior of mold assembly 44, except for voids 32 of mold inserts 28, is substantially filled. Other voids may be created by other portions of mold assembly 44. Thereafter, the molding material may be cured by heating, and upon cooling thereafter, upper mold portion 42 may be separated from lower mold portion 40, and the molded tire may be separated from lower mold portion 40, such that mold inserts 28 remain in the tire following separation of the tire from lower mold portion 40 to create cavities 22 in the tire corresponding to voids 32 of mold inserts 28.

For example, the method may include placing lower mold portion 40 on a device such as a cart that facilitates movement of lower mold portion 40. According to some embodiments, the surfaces of the interior of lower mold portion 40 may be treated with a mold release agent to reduce the likelihood of portions of the molded tire from adhering to lower mold portion 40. Similarly, the surface of the interior of upper mold portion 42 may be treated with a mold release agent.

According to some embodiments, for example, embodiments in which hub 12 forms a seal with lower mold portion 40 and/or upper mold portion 42, hub 12 may be placed in lower mold portion 40, such that a seal between hub 12 and lower mold portion 40 is formed. Upper mold portion 42 may be lowered onto lower mold portion 40, such that upper mold portion 42 and hub 12 engage one another in a sealed manner to form mold assembly 44.

According to some embodiments, mold assembly 44 may be heated prior to receiving the molding material. This may assist with preventing a portion of the molding material from cooling too quickly as the heated molding material contacts portions of the interior of mold assembly 44. According to some embodiments, mold assembly 44 may be moved into an oven for heating, for example, via a cart on which lower mold portion 40 may be located. According to some embodiments, mold assembly 44 may be heated at from 150° C. to 200° C. (e.g., 180° C.) for from 2 to 3 hours (e.g., 2.5 hours). Thereafter, the temperature of the oven may be reduced to from 100° C. to 140° C. (e.g., 120° C.) for from 1.5 hours to 2.5 hours (e.g., 2 hours). Thereafter, the temperature of the oven may be further reduced to from 60° C. to 100° C. (e.g., 80° C.).

According to some embodiments, the molding material may be preheated prior to being supplied to mold assembly 44. The molding material may be any moldable elastomeric material, such as, for example, polyurethane such as described previously herein, natural rubber, synthetic rubber, or any combinations thereof. The molding material may include any known additives for improvement of performance and/or appearance. Prior to, or during, preheating, any known preparation methods such as, for example, mixing, agitating, degassing, and/or sample testing may be performed. The molding material may be preheated to from 30° C. to 50° C. (e.g., 40° C.).

The temperature of the interior of mold assembly 44 may be measured, for example, using an infrared gun or other known methods. According to some embodiments, it may be desirable for the temperature of the interior to be greater than room temperature (e.g., about 24° C.), but less than from 70° C. to 90° C. (e.g., about 80° C.) prior to supplying the preheated molding material to the interior of mold assembly 44.

According to some embodiments, the molding material may be added to mold assembly 44 via apertures 46 in upper face plate 52 of upper mold portion 42. According to some embodiments, the interior of mold assembly 44 should be completely filled. According to some embodiments, it may be desirable to fill mold assembly 44 expeditiously in order to take advantage of the preheating of mold assembly 44 and the molding material, for example, to reduce the likelihood of the molding material cooling to a temperature below a desired level. For example, the molding material may be added to mold assembly 44 at a rate of at least 180 lbs. per minute (e.g., at least 220 lbs. per minute, for example, 510 lbs. per minute). After mold assembly 44 has been filled, caps may be secured over apertures 46.

According to some embodiments, the oven may be heated to a temperature ranging from 180° C. to 260° C. (e.g., 220° C.), for example, while mold assembly 44 is being filled. When mold assembly 44 has been filled and the oven reaches the desired temperature, the filled mold assembly 44 may be moved into the oven. Thereafter, the filled mold assembly 44 may be heated in the oven for a first predetermined period time at a first temperature. For example, the filled mold assembly 44 may be heated at a first temperature, such that the temperature of the molding material ranges from 180° C. to 260° C. (e.g., 220° C.) for from 1 hour to 2 hours (e.g., 1 hour and 40 minutes). According to some embodiments, thereafter the temperature of the oven may be reduced so that the filled mold assembly is heated for a second predetermined period of time at a second temperature, such that the molding material has a temperature of from 130° C. to 170° C. (e.g., 150° C.) for from 15 hours to 20 hours (e.g., 18 hours). According to some embodiments, curing the molding material by heating results in shell portions 30 of mold inserts 28 being chemically bonded (e.g., covalently bonded) to the molding material.

According to some embodiments, after the second predetermined period of time elapses, the filled mold assembly 44 may be removed from the oven. Thereafter, the molded tire may be removed from mold assembly 44 by separating upper mold portion 42 from lower mold portion 40 (e.g., via a lift apparatus), and separating the molded tire from lower mold portion 40. According to some embodiments, the molded tire may be removed from the mold before the mold and/or molded tire cool significantly.

INDUSTRIAL APPLICABILITY

The exemplary tires 10 disclosed herein may be used on machines configured to travel across terrain. For example, such machines may include any type of ground-borne vehicle, such as, for example, an automobile, a truck, an agricultural vehicle, and/or a construction vehicle, such as, for example, a wheel loader, a dozer, a skid-steer loader, an excavator, a grader, an on-highway truck, an off-highway truck, and/or any other vehicle type known to a person skilled in the art. In addition to self-propelled machines, the machine may be any device configured to travel across terrain via assistance or propulsion from another machine.

According to some embodiments, tire 10, including inner circumferential barrier 14, outer circumferential barrier 16, tread portion 18, and support structure 20, may be configured to provide a desired amount of traction and cushioning between a machine and the terrain. For example, support structure 20 may be configured to support the machine in a loaded, partially loaded, and empty condition, such that a desired amount of traction and/or cushioning is provided, regardless of the load.

The exemplary system 38 for molding a non-pneumatic tire may facilitate more design options than other systems. For example, mold inserts 28, by virtue of remaining in tire 10 following molding, may permit a wide variety of design options for cavities 22 in tire 10. Because mold inserts 28 may remain in tires 10, cavity shapes that were previously un-moldable in some molding systems may be achievable. Such design options may result in tires that provide support and cushioning tailored to the type of machine on which the tires are installed, while reducing stress concentrations in the tires relative to some cavity designs. For example, mold inserts 28 may be configured and/or arranged such that their longitudinal axes L are oblique with respect to rotational axis R of tire 10, resulting in cavities having longitudinal axes L that are oblique with respect to rotational axis R of tire 10.

It will be apparent to those skilled in the art that various modifications and variations can be made to the exemplary tires, systems, and methods. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A molded non-pneumatic tire comprising:
   an inner circumferential barrier configured to be coupled to a hub;
   an outer circumferential barrier radially spaced from the inner circumferential barrier; and
   a support structure having two opposing sides extending between the inner circumferential barrier and the outer circumferential barrier, and coupling the inner circumferential barrier to the outer circumferential barrier, wherein the support structure includes:
   a plurality of mold inserts at least partially embedded in the support structure, wherein the mold inserts include a shell portion at least partially enclosing a void providing a cavity in the support structure;
   wherein the tire has a rotational axis about which the tire rotates, and wherein the cavities define a longitudinal axis and are positioned between the opposing sides of the support structure such that the longitudinal axis is oblique with respect to the rotational axis.

2. The tire of claim 1, wherein the cavities are tubular and configured to extend between the opposing sides of the support structure.

3. The tire of claim 1, wherein the cavities are curved.

4. The tire of claim 1, wherein a first plurality of the cavities forms an inner circular pattern with respect to a first side of the opposing sides of the support structure, and a second plurality of the cavities forms an outer circular pattern with respect to the first side of the opposing sides, and wherein the first plurality of cavities extend radially outward as the first plurality of cavities extend between the first side of the opposing sides and a second side of the opposing sides.

5. The tire of claim 1, wherein the support structure is formed from polyurethane.

6. The tire of claim 5, wherein the mold inserts are formed from polyurethane.

7. The tire of claim 6, wherein the polyurethane forming the support structure is a first polyurethane having a first composition, and the polyurethane forming the mold inserts is a second polyurethane having a second composition.

* * * * *